Aug. 28, 1956 W. F. TOMMILA 2,760,531
SAW BLADE GUIDE PIN
Filed Jan. 31, 1955
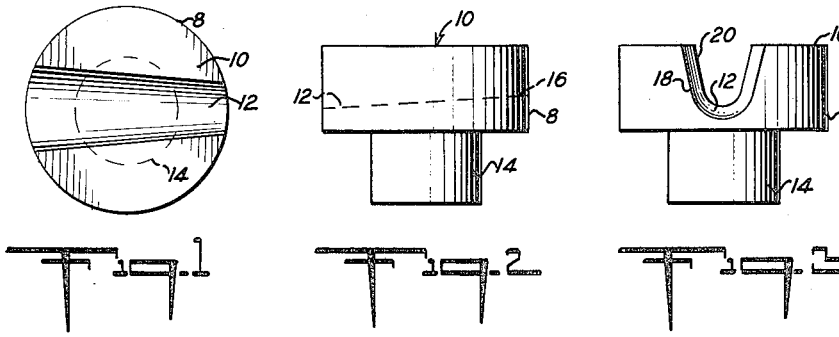
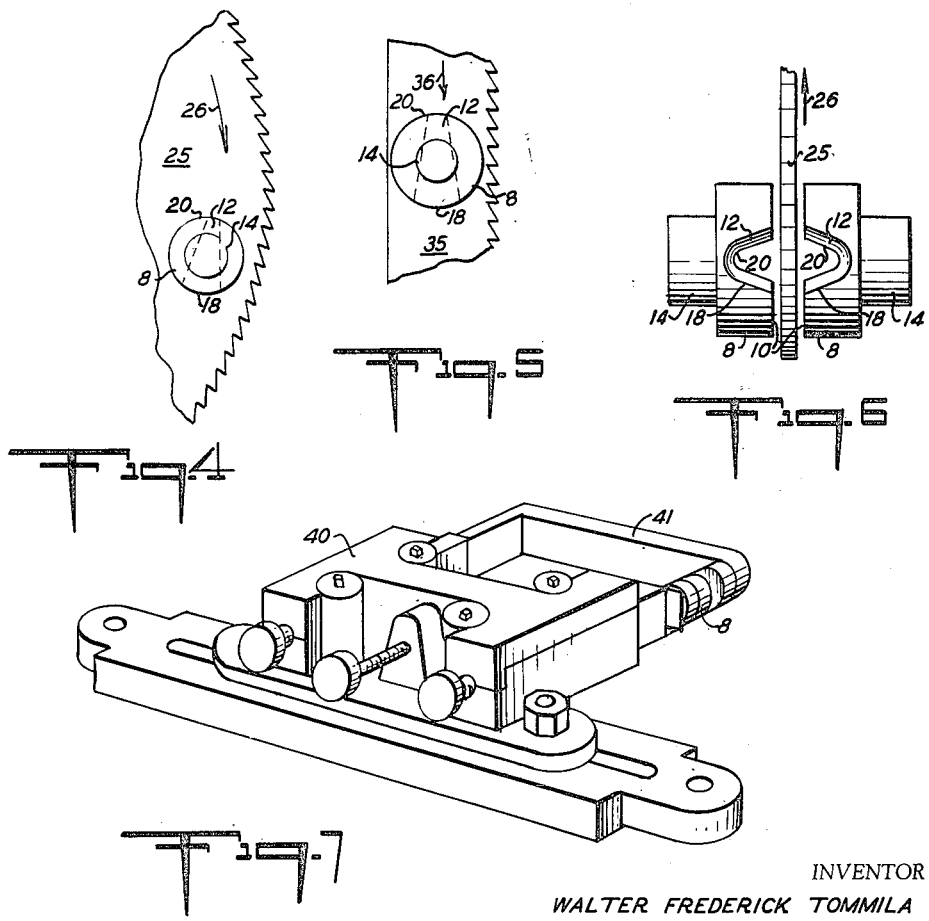
INVENTOR
WALTER FREDERICK TOMMILA
BY *Fisher & Christen*
ATTORNEY

United States Patent Office 2,760,531
Patented Aug. 28, 1956

2,760,531

SAW BLADE GUIDE PIN

Walter F. Tommila, Troy, N. H.

Application January 31, 1955, Serial No. 485,129

5 Claims. (Cl. 143—160)

This invention pertains to a saw guide pin and more particularly to a self-cleaning saw guide pin of novel construction.

Prior to this invention, there has been a tendency for sawdust gums and other waste materials produced by the saw blade to build up on the guide surface or face of the saw guide pin. This build-up of material caused the guide pin to bind against the saw blade resulting in friction and heat which produced poorer sawing performance, reduced output and caused defective production. This condition also required a periodic shut-down of equipment in order to clean and adjust the saw guide pins, and it shortened the life of the guide pins.

Therefore, an object of this invention is to provide a saw guide pin of simple and inexpensive construction which will last longer and require less attention than previously used pins.

A further object of this invention is to provide a saw guide pin which is self-cleaning and will cut down appreciably on the amount of waste material which normally builds up on the radial face of such pins.

These and other objects are accomplished by providing a self-cleaning saw blade guide pin having a groove extending completely across the surface of the pin which is adjacent the saw blade, whereby fragments from the material being cut can pass through said groove. Preferably, the walls defining said groove are tapered so that any particle which enters can be swept out by the air movement created by the moving blade. In the preferred construction a cylindrical saw guide pin has a tapered groove extending diametrically across the radial surface thereof. In operation, a pair of these cylindrical self-cleaning saw guide pins are mounted oppositely on each side of a saw blade, each pin having its grooved radial face adjacent the saw blade with the tapered groove extending diametrically across said face, the tapered groove extending and being constantly increased in size in the direction of movement of the saw blade.

Restated, the present invention comprises a pair of self-cleaning saw blade guide pins mounted oppositely on each side of the blade and groove means associated with said pins at their surface adjacent said blade whereby the movement of the saw blade between said pins will keep them clean by suction. The groove means preferably comprises a tapered groove extending across the surface of the pin adjacent the blade with its larger end pointed in the direction of movement of said saw blade.

A more detailed description of this invention now follows with references to the drawings of which Fig. 1 is a plan view of the radial face of the improved saw guide pin;

Fig. 2 is an elevational view of the improved saw guide pin showing a side view of the tapered groove therein;

Fig. 3 is an elevational view of the improved saw guide pin showing a front view of the tapered groove therein;

Fig. 4 is a diagrammatic representation of a circular saw blade equipped with the saw guide pin of this invention;

Fig. 5 is a diagrammatic representation of a band saw blade equipped with the saw guide pin of this invention;

Fig. 6 is a diagrammatic representation of the saw blade guide pins mounted in a saw guide on opposite sides of a circular saw blade; and Fig. 7 is a perspective view of a typical saw guide with which the improved pins are used.

With reference to the drawings, in Fig. 1, numeral 8 represents the body portion of a saw blade guide pin having radial face 10. Tapered groove 12 extends diametrically across face 10 in the preferred embodiment. The dotted circle in Fig. 1 is shank 14 and is seen in Figs. 2 and 3 from a side view. Shank 14 is provided so that the pins 8 may be held in a conventional saw guide.

Fig. 2 shows the bottom 16 of groove 12. This bottom slants upwardly towards the smaller end 20 of the groove 12 from the larger end 18 as shown in Fig. 3.

Fig. 4 represents the use of the improved saw guide pin with a circular saw blade 25 which rotates in the direction of arrow 26. Groove 12 faces in the direction of rotation of blade 25 so that the blade passes from smaller end 20 to larger end 18 of groove 12.

The use of a similar saw guide pin with a band saw blade 35 is represented in Fig. 5. The movement of the blade 35 is in the direction shown by arrow 36 past the groove 12 from smaller end 20 to larger end 18.

In actual operation, a pair of oppositely facing pins are mounted in a saw guide on each side of a blade. The foregoing is well known in the art. In this improved construction, the oppositely facing grooves 12 form a more or less tapered hole through which the saw blade passes creating a draft of air therethrough. The tapered portion creates a cleaning effect produced by the increasing size of the opening in the grooves 12 and the air draft created by the moving blade passing therethrough.

Fig. 6 shows how a circular saw blade 25 rotating in the direction of arrow 26 passes between radial faces 10 from the smaller end 20 to the larger end 18 of groove 12.

This cleaning affects the entire area of the radial face 10 of saw guide body 8 in that it tends to keep the face 10 of the saw guide pin free from fragments of the material being cut. The fragments of waste material, such as sawdust, are pulled from the face 10 through the tapered groove 12 by the air movement.

Fig. 7 represents the usual type of saw guide 40 used in conjunction with these pins. Adjustable arms 41 and 42 hold the pins in a fixed postion relative to the blade during operation. Such saw guides are broadly old in the art as demonstrated by U. S. Patent 295,792 to Neacy, issued March 25, 1884.

The body portion 8 of the saw guide pin can be produced from a soft bearing metal such as brass or bronze; however, the preferred material used with this invention is nylon, which has been found to have superior bearing qualities, and in which the tapered groove 12 may be extremely easily made.

It can be seen that variations in the structure of the pins may be made within the spirit and scope of my invention as defined by the following claims.

I claim:

1. A self-cleaning saw blade guide pin comprising a single mounting stem and a cylindrical guide body mounted thereon, said body including a flat saw-retaining surface on the side opposite said mounting stem and said surface being provided with a groove having side walls tapered outwardly in the direction of saw movement whereby fragments from material being cut will be pulled through said tapered groove by the suction created by the movement of the saw blade past said tapered groove.

2. A saw guide pin as defined in claim 1 wherein said cylindrical body is made of nylon.

3. A pair of self-cleaning saw guide pins each constructed in accordance with claim 1 and mounted in cooperative opposed relationship one on each side of a saw blade, each of said grooves extending across the entire face of said guide body and each groove being of increasing depth in the direction of movement of said saw blade.

4. A pair of cylindrical saw guide pins as defined in claim 3 wherein said guide bodies are made of nylon.

5. A pair of self-cleaning saw blade guide pins adapted to be mounted in cooperative opposed relationship one on each side of a saw blade each pin comprising a unitary flat blade engaging surface, mounting means for said surface and a tapered groove extending across each of said surfaces adjacent said blade, said tapered groove having its larger end pointed in the direction of movement of said saw blade.

References Cited in the file of this patent

UNITED STATES PATENTS

| | | |
|---|---|---|
| 295,792 | Neacy | Mar. 25, 1884 |
| 337,912 | Allington | Mar. 16, 1886 |
| 694,337 | Van Horn | Feb. 25, 1902 |
| 797,018 | Prescott | Aug. 15, 1905 |
| 820,312 | Perkins | May 8, 1906 |
| 981,340 | Whitaker | Jan. 10, 1911 |